United States Patent

[11] 3,591,753

| [72] | Inventor | William J. Gartner |
| | | Schaumburg, Ill. |
| [21] | Appl. No. | 883,215 |
| [22] | Filed | Dec. 8, 1969 |
| [45] | Patented | July 6, 1971 |
| [73] | Assignee | Kem Industries, Inc. |

[54] PLANAR ELECTRICAL FOOD WARMER
3 Claims, 4 Drawing Figs.

[52] U.S. Cl.................................................. 219/464,
219/345, 219/468, 219/543, 219/544, 219/548
[51] Int. Cl...................................................... H05b 3/68,
H05b 3/06, H05b 3/16
[50] Field of Search.......................................... 219/464,
465, 467, 468, 345, 449, 543—4, 528—9, 549,
535

[56] References Cited
UNITED STATES PATENTS

| 2,719,213 | 9/1955 | Johnson ....................... | 219/345 X |
| 2,783,358 | 2/1957 | Wolf............................ | 219/345 X |
| 2,763,565 | 12/1960 | Moore et al. ................. | 219/543 X |
| 3,043,943 | 7/1962 | Moot............................ | 219/449 |
| 3,385,959 | 5/1968 | Ames et al. .................. | 219/549 |
| 3,281,579 | 10/1966 | Glicksman.................... | 219/535 |
| 3,496,336 | 2/1970 | Hingorany et al. ............ | 219/464 |

*Primary Examiner*—Volodymyr Y. Mayewsky
*Attorney*—Dressler, Goldsmith, Clement & Gordon ABSTRACT: An electrical food warmer is provided having a hermetically sealed shell made of a thermoplastic material. The heating unit which underlies the flat top of the shell is a sheet having an insulating layer coated with an electrically conductive coating to provide a resistance between about 25 and about 100 ohms per square.

PATENTED JUL 6 1971 3,591,753

INVENTOR
William J. Gartner
BY Dressler, Goldsmith, Clement & Gordon
ATTORNEYS

PLANAR ELECTRICAL FOOD WARMER

BACKGROUND OF THE INVENTION

Electrical food warmers to bring food to a desirable elevated serving temperature, or to keep food at such a temperature, have come into wide use. Such warmers generally comprise an upper flat surface of high-temperature resistant glass with metallic heating elements embedded therein. The heating elements are in the form of parallel wires or parallel thin strips of foil. The heating elements are framed by metal walls and a metal bottom is provided, together with legs and handles, as desired, which may be made of a plastic material to protect the surface on which the food warmer rests and to protect the hands if the warmer must be handled while hot.

When the food warmers of the prior art become dirty because of spillage, or some other reason, they cannot be washed by total immersion in water, or with large amounts of water because the warmers are not hermetically sealed and water could damage their internal electrical elements. Nor is it practical to provide hermetic sealing for a warmer which has a glass element in juxtaposition to metallic elements.

SUMMARY OF THE INVENTION

In accordance with this invention, a food warmer is provided which has a hermetically sealed shell made of a thermoplastic resin. The shell has a flat upper surface and a flat heating element below it. The heating element is an electrically conductive sheet having a resistance between about 25 and about 100 ohms per square, and having strip electrodes at its opposite edges. Electrical connections pass through a wall of the shell in hermetically sealed relationship to it and are connected on the interior of the shell to the strip electrodes.

The heating element used in accordance with this invention provides a uniform, moderately elevated temperature without hot spots and thus permits the use of a thermoplastic resin which is impractical with the conventional heating element. The use of the thermoplastic resin in the shell permits construction for hermetic sealing which protects the electrical elements from water damage.

BRIEF DESCRIPTION OF THE SEVERAL VIEWS OF THE DRAWING

The invention is best understood by reference to the drawings of which.

DESCRIPTION OF SPECIFIC EMBODIMENT

Figure 1:
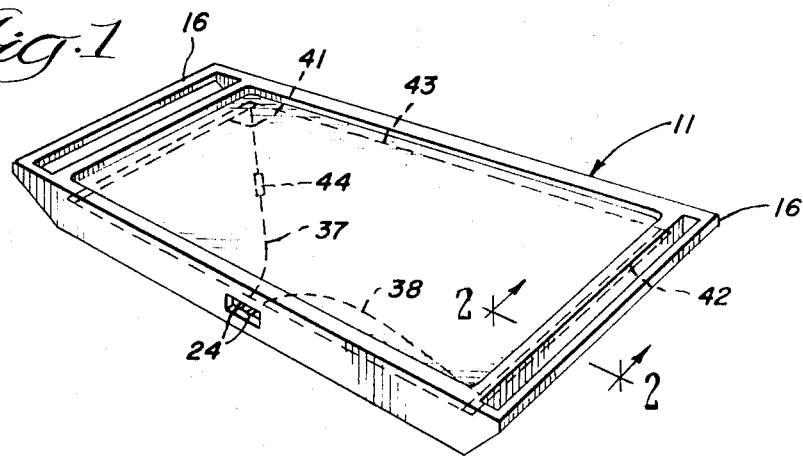
FIG. 1 is a perspective view of the food warmer of this invention.

As shown in the drawings, the shell 11 of the warmer comprises a unitary molding 12 which includes the flat top surface 13, sidewalls 14, handles 16 and lower rim 17. The bottom piece 18 is separately molded and includes a tapered peripheral bead 19 which is press fitted into tapered groove 21 in the lower part of the unitary molding. A raised rim 22 which frames the flat surface 13 is an integral part of the unitary molding.

The unitary molding 12 and the bottom piece 18 are each made by injection molding from a thermoplastic resin, such as a polycarbonate resin, having good mechanical strength and good resistance over long periods to moderately elevated temperatures, of the order of about 200° F. Other thermoplastic materials which may be used include polyphenylene oxide resins, phenylene oxide-styrene copolymers, acrylic resins such as polymethylmethacrylate, high-temperature acrylonitrile-butadiene-styrene terpolymers, and polystyrene.

The peripheral bead 19 has a taper of somewhat smaller angle (about 1°) than the taper of groove 21 so that it may be inserted therein without difficulty, fitting snugly therein when the flat part of bottom piece 18 rests against shoulder 23. A liquid solvent for the resin of construction of the moldings, preferably containing some of the resin in solution therein is applied in the narrow spaces between bead 19 and groove 21 to soften the resin and to cause the moldings to join together in the area of pressure contact between them and thereby form a true thermoplastic junction.

Figure 4:
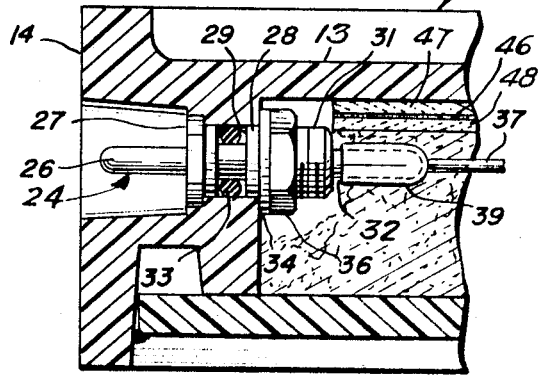
FIG. 4 is an enlarged section through section 4-4 of FIG. 3.

One of the walls 14 has two closely spaced apertures therein for passage therethrough of two electrical connectors, or pins 24. As shown in FIG. 4, each pin has an external projection 26, an external noncircular collar 27 which fits into a corresponding recess in wall 14, a central section 28 of smaller cross section than said noncircular collar and containing an O-ring groove 29, a threaded section 31 and an internal projection 32. Typically, the collar 27 is disc shaped with a segment cut off so that when set into a similarly shaped recess, it cannot rotate.

During fabrication of the food warmer of this invention, an O-ring 33 is set into the O-ring groove of each pin 24, and each pin is forced into one of the apertures of wall 14 so that collar 27 rests in its recess and the O-ring fits tightly against the wall of the aperture. Washer 34 and nut 36 are then placed over the threaded section of each pin, and the nut is tightened until the washer rests snugly against the inner surface of wall 14. Electrical wires 37 and 38 connect to the internal projections 32 through sleeve connectors 39.

The opposite ends of wires 37 and 38 are connected to strip electrodes 41 and 42 which pass through heating element 43 close to opposite edges thereof. Thermostat 44 is provided in wire 37 to control the temperature of the food warmer at a predetermined level.

Figure 2:
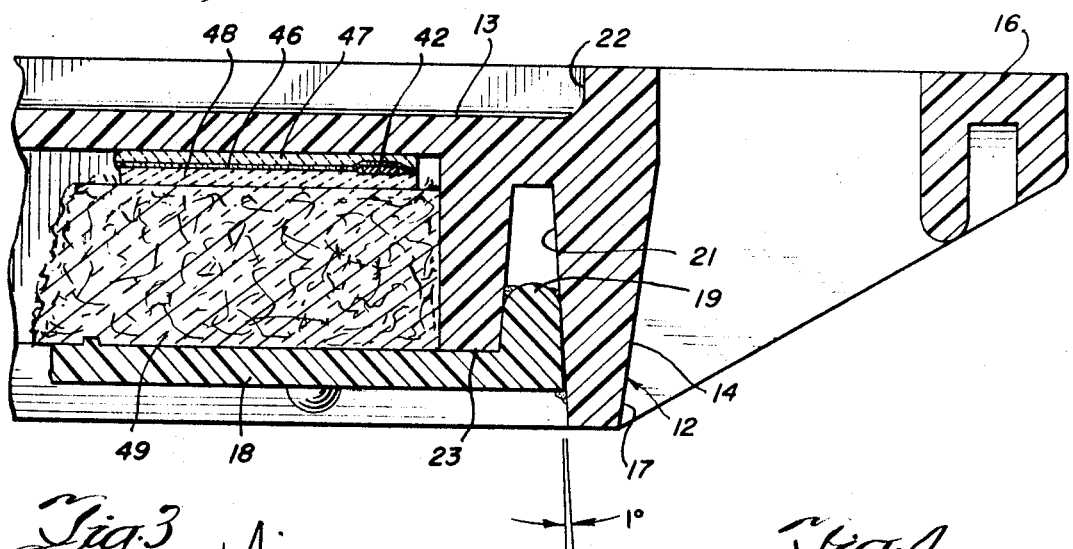
FIG. 2 is an enlarged fragmentary vertical cross-sectional view of one end of the food warmer taken through plane 2-2 of FIG. 1.
Figure 3:
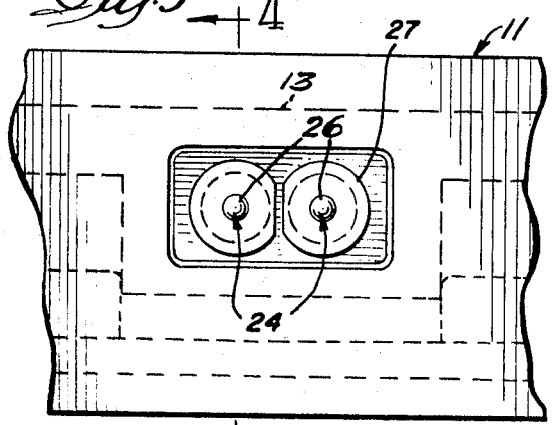
FIG. 3 is an enlarged fragmentary vertical elevation of a portion of a sidewall of the food warmer which includes the electrical terminals.

The heating element 43 (its thickness exaggerated for clarity in FIG. 2) lies under the flat top surface 13 and is in contact therewith. Essentially, the heating element comprises a conductive layer 46 which is a deposited layer of an admixture of electrically conductive fine particles, such as graphite particles, and electrically nonconductive fine particles, such as particles of a silica gel. The conductive layer is deposited on an insulating base 47, such as a sheet of asbestos paper and is covered with an insulating layer 48, such as another sheet of asbestos paper, so that the conductive coating is sandwiched between insulating layers.

The strip electrodes, typically strips of copper foil, about 1/4¼ inch wide, are also sandwiched between the two layers of asbestos paper, running along the entire length of the heating element just inside of opposite edges thereof.

The nature of the conductive layer, per se, and the nature of the heating element, per se, are not part of this invention since such layers and such elements are described in the prior art, as for example, in U.S. Pat. Nos. 2,991,257, 2,803,566, and 3,179,544.

As is known, such conductive layers can be "tailor made," within a broad range, to any desired level of resistance by varying the proportions of conductive and nonconductive particles and/or the thickness of the layer. Greater amounts of nonconductive material, lesser amounts of conductive material and lesser thicknesses are conducive to higher resistances.

U.S. Pat. No. 3,179,544 is particularly relevant since it describes a conductive layer in a preformed structure sandwiched between a supporting insulating base and a covering insulating layer and containing two electrode strips, each running the entire length of the preformed structure, one near each edge of the conductive layer. Preformed structures of the nature of those disclosed in U.S. Pat. No. 3,179,544, where both the insulating base and insulating layer may be made of asbestos paper, are particularly useful as the heating element of this invention.

The conductive layer should be of such character that it provides between about 20 and 100 ohms of resistance per square. Generally, the higher resistances within this range are used at higher line voltages. For line voltages of about 120 volts, a suitable range of resistance values is from about 30 to about 60 ohms per square, and preferably about 40 ohms per square.

Wires 37 and 38 are connected to the respective strip electrodes by baring about an inch at the end of each wire and stapling the bared end to the heating element structure directly over each of the electrodes so that the staples pass through the electrodes and make electrical contact therewith.

The heating element is located just under the flat top surface 13 and in contact with the lower surface thereof. It may, if desired, be glued to said lower surface, but it is generally held in position merely by virtue of the fact that the remainder of the shell cavity is filled with glass wool insulation 49 which presses the heating element into contact with said lower surface.

A typical food inches constructed in accordance with this invention may have a heated flat upper surface about 16 inches by about 12 inches with a heating element of substantially the same dimensions immediately therebelow aligned so that its strip electrodes run in the short (12 inches) direction parallel to the handles of the warmer. The heating element provides uniform heat at a maximum element temperature of about 220° F., resulting in a uniform top surface temperature of about 180° F.

Because of the fact that the temperature generated by the heating element is so uniform and hot spots are avoided, the polycarbonate resin of construction is unharmed, even after extended usage. The warmer, because of its hermetically sealed construction, may be completely submerged in water for cleaning purposes without damage to its electrical elements.

It will be apparent to those skilled in the art that numerous modifications may be made without departing from the essence of this invention.

I claim:

1. A food warmer comprising a hermetically sealed shell made of a thermoplastic resin, said shell having a flat upper surface and a flat heating element therebelow, said heating element comprising a conductive sheet and strip electrodes attached to the opposite edges thereof, said conductive sheet comprises a conductive coating deposited on an insulating layer and having a resistance between about 25 and about 100 ohms per square, said conductive coating comprising particles of an electrically conductive material and particles of an electrically nonconductive material, said conductive coating and said strip electrodes being sandwiched between and enclosed by said insulating layer and a second nonconductive sheet material, said insulating layer and said second nonconductive sheet material comprising papers made of inorganic fibers, electrical connections passing through a wall of said shell in hermetically sealed relationship thereto, said connections being connected on the interior of said shell to said strip electrodes at opposite edges of said heating element, said sealed shell comprises two separate unitary moldings, all of the sides of said sealed shell being in one molding, said moldings being joined together by thermoplastic junction, the interior of said sealed shell below said heating element containing a thermal insulating material made of inorganic fibers.

2. The food warmer of claim 1 wherein said thermoplastic resin is a polycarbonate resin.

3. The food warmer of claim 1 wherein said insulating layer and said second nonconductive sheet material comprise asbestos paper.

PO-1050
(5/69)

UNITED STATES PATENT OFFICE
CERTIFICATE OF CORRECTION

Patent No. 3,591,753          Dated July 6, 1971

Inventor(s) William J. Gartner

It is certified that error appears in the above-identified patent and that said Letters Patent are hereby corrected as shown below:

Column 2, line 48, "1/4" (first occurrence) should be deleted; Column 3, line 16, "inches" should read -- warmer --.

Signed and sealed this 7 th day of December 1971.

(SEAL)
Attest:

EDWARD M. FLETCHER, JR.          ROBERT GOTTSCHALK
Attesting Officer                Acting Commissioner of Patents